United States Patent

[11] 3,582,574

[72] Inventor Mel Grau
1420 Rising Glen Road, Los Angeles, Calif. 90069

[21] Appl. No. 817,851
[22] Filed Apr. 21, 1969
[45] Patented June 1, 1971

[54] TELEPHONE ATTACHMENT
9 Claims, 7 Drawing Figs.

[52] U.S. Cl. 179/157
[51] Int. Cl. H04m 1/04
[50] Field of Search 179/157

[56] References Cited
UNITED STATES PATENTS

| | | | |
|---|---|---|---|
| 2,584,807 | 2/1952 | Miller | 179/157 |
| 2,777,017 | 1/1957 | Keely | 179/157 |
| 3,141,072 | 7/1964 | Neilsen | 179/157 |

*Primary Examiner*—William C. Cooper
*Attorney*—Lindenberg and Freilich

ABSTRACT: A nonmanual support for a telephone handset. A compactly configured shoulder support element is hinged to, biased toward and encloses a mounting plate. A strip of pressure sensitive adhesive detachably secures the support to a telephone handset.

PATENTED JUN 1 1971

3,582,574

INVENTOR
MEL GRAU

BY Lindenberg & Freilich
ATTORNEYS

TELEPHONE ATTACHMENT

BACKGROUND OF THE INVENTION

1. Field of the Invention

The present invention relates to a two-position support for the handset portion of a telephone transceiver instrument and more particularly to a telephone attachment that functions as a shoulder support in an open position and which rotates to a compact, attractive, noninterfering configuration when closed.

2. Description of the Prior Art

The telephone support of the present invention is an improved attachment for the handset type of telephone currently in use which utilizes a handle having a substantially rectangular configuration. Many of these telephone supports previously described were designed and only adapted for use with the less modern type of handset which utilized a triangular handle portion. Furthermore, the supports were attached to the handset with complex clamps, straps or the like which interfered with a comfortable gripping of the hand piece, could interfere with the stable cradling of the handset in the base and were quite bulky and unattractive when installed on the handset.

OBJECTS AND SUMMARY OF THE INVENTION

It is therefore an object of this invention to provide a telephone support which is quickly and readily attached to the handset and does not interfere with the gripping, attractiveness or cradling of the handset.

Another object of the invention is the provision of a support for a telephone handset take takes up a minimum of space and does not detract from the appearance of the telephone handset.

A further object of the invention is the provision of a shoulder support for a telephone handset that permits the user to support the telephone in a natural position of his head and neck while leaving his hands free for other purposes.

A still further object of the invention is to provide a telephone attachment which is simple and inexpensive to manufacture and install and yet is very attractive and effective during use.

Yet still another object of the invention is the provision of telephone attachment which closes to a compact, contoured, comfortable, and attractive configuration and which opens to an operative, open position permitting the handset of the telephone to be stably supported with the head and shoulder of the user in a natural and comfortable position.

Still another object of the invention is to provide a support for the hand piece of a telephone which may be readily applied to or removed from the hand piece without interfering in any way with the operation or maintenance of the handset.

These and other objects and many attendant advantages of the invention will become apparent as the description proceeds.

The nonmanual support for a telephone handset instrument according to the invention comprises an elongated shoulder gripping element and an elongated substantially planar mounting plate. Fastening means are provided on the bottom surface of the plate for securing it to the handle part of the instrument. Hinge means associated with the upper end of the plate rotatably join the upper end of the element to said plate so that the element overlies the plate. The support may further include spring means associated with the hinge adapted to bias the element towards the plate. The element may include a recess in the shape of the plate to allow the element to close tightly and compactly over the plate. The top surface of the element is preferably contoured to substantially conform to the prevalent shape of the instrument so that the overall support is both attractive and comfortable to use in its closed position.

The invention will now become better understood by reference to the following detailed description when considered in conjunction with the accompanying drawings.

DESCRIPTION OF THE PREFERRED EMBODIMENTS

Figures 1, 2, 3, 4, 5, 6, 7:
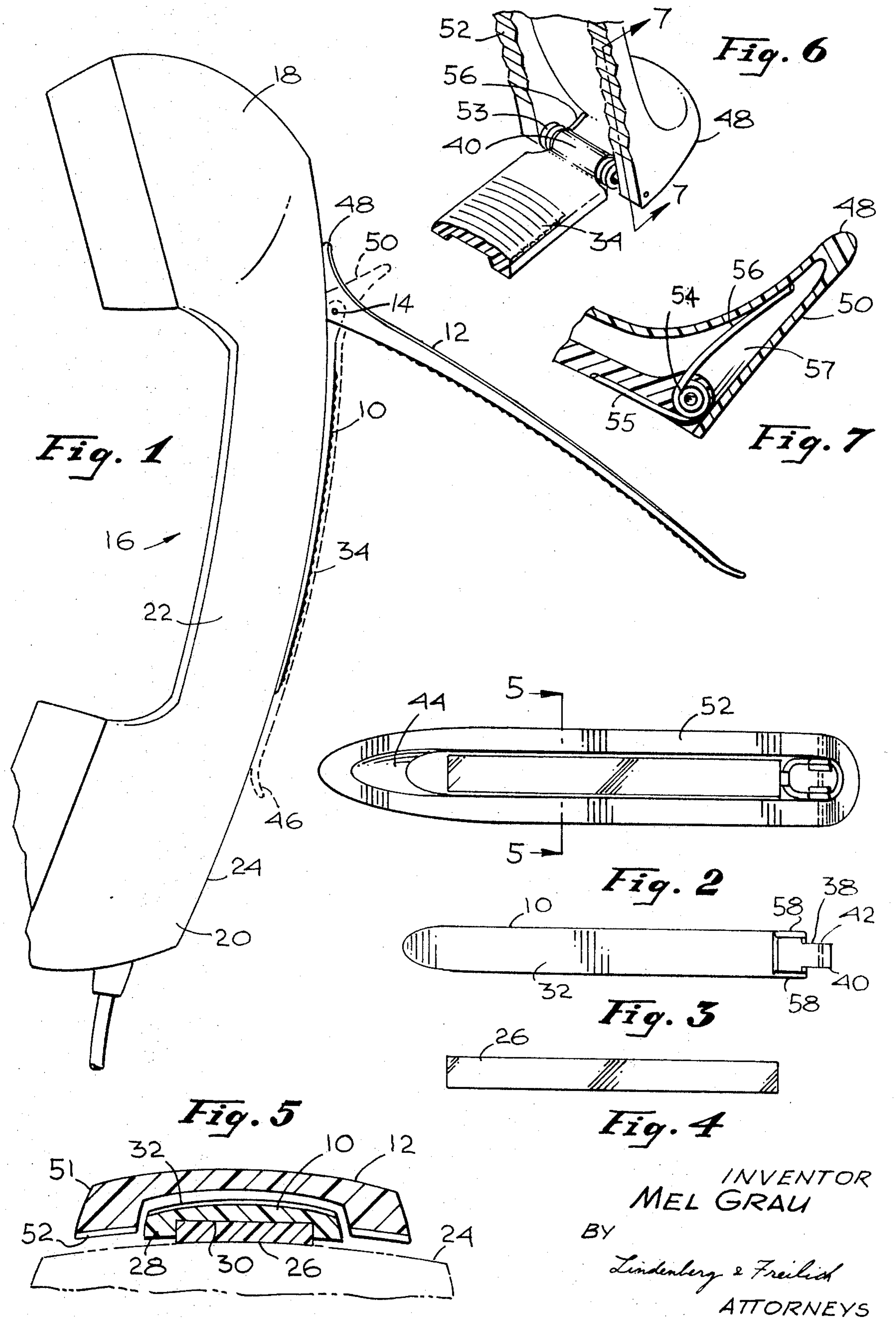
FIG. 1 is a side view of the telephone support of the invention with the shoulder support element shown in open position in solid lines and in a closed position in dotted lines.
FIG. 2 is a bottom view of the telephone support of the invention before assembly to a telephone.
FIG. 3 is a front elevational view of the backplate of the support of the invention.
FIG. 4 is a front elevational view of the pressure sensitive tape utilized in the support of the invention.
FIG. 5 is a cross-sectional view taken on the line 5–5 of FIG. 2.
FIG. 6 is an enlarged partial perspective view of the top end of the telephone support of the invention illustrating the hinge and spring apparatus.
FIG. 7 is a cross-sectional view taken on the line 7–7 of FIG. 6.

Referring now to FIG. 1 the telephone handset support generally comprises a backplate 10 and a shoulder support element 12 rotatably joined at their upper ends by means of a hinge pin 14. The telephone support of the invention is normally in a closed position shown in dotted lines but may be rotated about 60° to an open, operative position to engage the shoulder of the user.

The support of the invention is intended to be utilized with the handset portion 16 of a typical portable telephone. The handset 16 has an upper earpiece receiver 18 and a lower transmitter mouthpiece 20 which are jointed by means of a substantially rectangular handle portion 22. The support of the invention is applied to a substantially planar back face 24 of the handle portion and as will be described conforms substantially to the curvilinear shape of the face 24.

Referring now more particularly to FIGS. 2—5, the backplate 10 is detachably secured to the back face 24 of the grip portion of the handset by means of a strip 26 of pressure sensitive adhesive tape. The strip may be of the double adhesive type and may also thus adhere to the inner face 28 of the backplate 10. A cavity 30 may be provided in the inner face 28 to partially recess the strip 26 of tape and thus minimize the projection of the support from the handset.

The outer face 32 of the backplate 10 may be slightly rounded to conform more nearly to the prevailing contour of the back face 24 of the grip portion of the handset. The outer face 32 may further include throughout its length a series of serrations 34 which will provide a more stable support of the handset on the front portion of the user's shoulder. The upper end of the plate is narrowed to form a detent 38 having an integrally molded cylinder 40 formed thereon through which is provided a hinge pin receiving bore 42.

The shoulder support element 12 is an elongated hollow member having a cavity 44 formed in the inner surface thereof substantially equal in length, width and depth to that of the backplate 10. The lower end of the element tapers somewhat in width and has an upturned tail portion 46 which serves as a finger grip to open and raise the element 12 to its open position. The upper end of the element has a hollow raised and curved lip portion 48, the outer end of which can also serve as a thumb lever to raise the element 12 to its open position. The full extent of opening of the element 12 is selectively controlled in the design of the top face 50 of the lip 48. The face 50 acts as a stop in the full, extended, open position and as the angle of the top 50 is changed the extent of the opening of the element 12 will change accordingly. The inner edge portions 51 surrounding the cavity 44 also contain serrations 52 which are adapted to engage the back portion of the shoulder of the user. The outer surface of the element 12 is contoured along its length and across its width to match the prevailing lines of the handset as closely as possible.

Referring now more particularly to FIGS. 6 and 7 the support element 12 is maintained in a normally closed position by means of a spring 54 which is associated with the hinge pin 14.

The spring 54 is formed of a continuous strand of metal which contains a coil portion 53, and two orthogonally directed ends 55 and 56. One end 56 is inserted into the hollow portion 57 of the lip 48. The other end 55 of the spring is placed in a groove 58 formed in the inner face of the wider portion of back plate 10. One spring 54 may be provided on each side of detent 38 or a central portion can be removed from cylinder 50 to receive a single spring 54. Other suitable biasing means may be utilized to bias element 12 toward plate 10. This biasing force in the open position also contributes to a firmer and more stable gripping of the user's shoulder.

The support is assembled by disposing spring 54 adjacent each end of the cylinder 40 with the depending ends 55 inserted into the grooves 58 in the backplate 10. The element 12 is then placed over the other ends 56 of the springs with the pin receiving apertures in registration with the bore 42 through cylinder 40. The pin 14 is then inserted to complete the assembly. The support is secured to the back face 24 of the handset by removing the protective film, if any, from the adhesive tape 26 and deposing it in cavity 28 and then securing the assembly with the hinge end upward to the back face 24 of the handset.

The telephone support of the invention in the open position permits the telephone handset to rest on the shoulder without use of the hands. The element is easily opened by applying the thumb to the back lip or a finger to the front lip of the support element. When the telephone support is in its closed position it acts as a comfortable and attractive grip for the telephone. As discussed previously, the telephone support of the invention can be made out of the same type of resin as that of the handset and can be colored identically to that of the handset so as to increase its attractiveness. The device is both simple to manufacture and operate and will be reliable in use since only one moving part is required and the only part subject to wear, a spring, can easily be replaced, if necessary, by removing the pin and installing a new spring and reassembling the unit.

It is to be understood that only preferred embodiments of the invention have been described and that numerous substitutions, alterations and modifications are all permissible without departing from the spirit and scope of the invention as defined in the following claims.

I claim:

1. A nonmanual support for a telephone handset instrument having a curved backwall face extending between the earpiece and mouthpiece thereof comprising:

an elongated shoulder gripping element having a first surface facing said wall and a second surface;

an elongated curvilinear mounting plate having a convex inner surface adapted to fit said backwall face and an outer surface facing said first surface;

fastening means on the inner surface of said plate for securing said plate to the backwall face of said instrument; and hinge means associated with the end of said plate nearest said earpiece for rotatably joining said end of said element to said plate.

2. A support according to claim 1 further including spring means associated with said hinge adapted to bias said element towards said plate.

3. A support according to claim 2 in which said spring includes a coil having a pair of elongated ends, and means within said element and said plate for securing said ends.

4. A support according to claim 1 wherein the first surface of said hinged element facing said plate is recessed to form a cavity for covering said plate and the second surface of said element is contoured to substantially conform to the prevalent shape of the backwall of said instrument when said element is in closed position.

5. A support according to claim 4 wherein the end of said element adjacent said earpiece is enlarged to form a lip curving outwardly from said second surface for rotatably opening said element when the lip is engaged by the user's thumb and the top edge of said lip between said first and second surfaces facing said backwall in closed position and abutting said backwall in open position forms a stop to limit the angle of opening said element.

6. A support according to claim 1 in which the inner shoulder engaging surfaces of the element and the plate are serrated to form shoulder gripping edges.

7. A support according to claim 1 in which the fastening means comprises pressure sensitive adhesive tape for detachably securing said plate to the backwall of said instrument.

8. An instrument according to claim 7 wherein said inner surface of said plate is relieved to form a recess which receives a substantial portion of the thickness of said tape.

9. A support according to claim 1 wherein said plate and said element are formed of plastic.